S. Whalen,
Hay Knife.

Nº 10,874.  Patented May 2, 1854.

UNITED STATES PATENT OFFICE.

SETH WHALEN, OF WEST MILTON, NEW YORK.

HAY-KNIFE.

Specification of Letters Patent No. 10,874, dated May 2, 1854.

*To all whom it may concern:*

Be it known that I, SETH WHALEN, of West Milton, in the county of Saratoga and State of New York, have invented a new and useful Improvement in Hay-Knives; and I do hereby declare that the following is a full, clear, and exact description of the same, reference being had to the accompanying drawings, forming part of this specification, in which—

Figure 1:
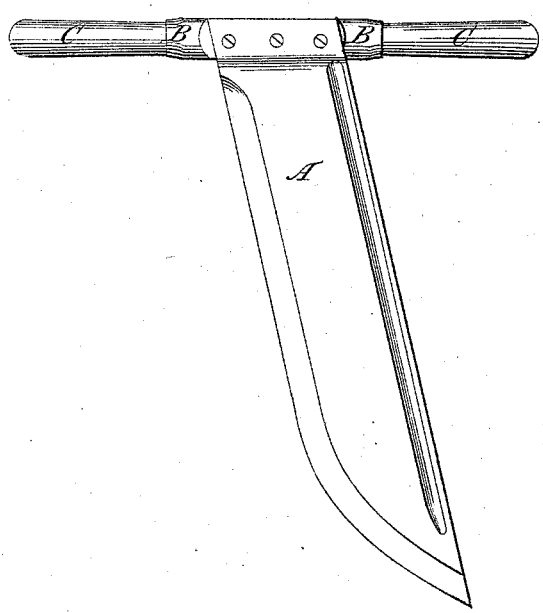
Figure 2:
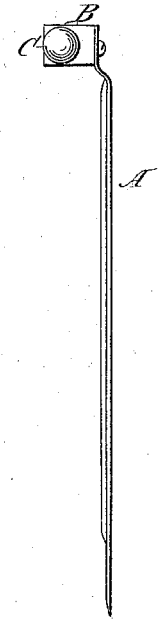
Figure 3:
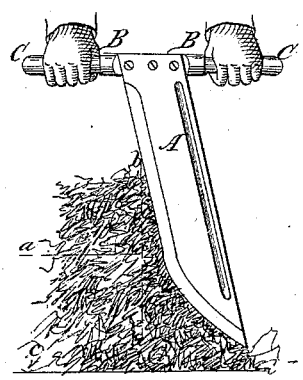
Figure 4:
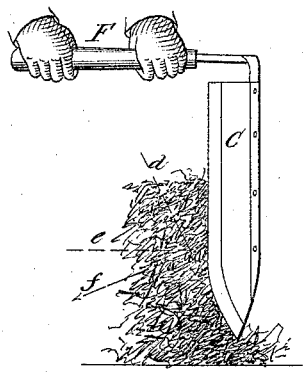

Figure 1, is a face or side view of the knife without a shank. Fig. 2, is a plan of the cutting edge of the same. Fig. 3, is a side or face view of the same. This view illustrates the utility of this knife over others, the outline of a man's hands being shown for the purpose of illustrating plainly the manner of using the knife, a stack of hay being also shown and the knife in the act of cutting. The horizontal vertical and angular directions in which the power is exerted upon the hay when this knife with the blade in the center of the handle is used is illustrated by the red lines. Fig. 4, is a side or face view of the ordinary hay knife with a shank. This view illustrates in a similar manner to Fig. 3 the manner of using this knife and the direction in which the power is exerted upon the hay when said knife is used.

Similar letters of reference in each of the several figures indicate corresponding parts.

The nature of my invention consists in forming the blade of thin sheet steel, and bending it near its upper extremity in such a manner that it may be directly attached to the center of the handle and be made to stand out from it a suitable distance without the employment of a shank, as in the ordinary way, this simple method of constructing hay knives enabling me to save a very considerable portion of the time, labor and money now expended in making the ordinary hay knives.

My invention consists, 2nd, in attaching the blade in the center of the handle, so that the operator may obtain greater leverage or be enabled to exert a greater and more effectual pressure in the proper direction than with the ordinary knife where the blade is attached to one end of the handles and the power of both arms exerted upon one handle instead of being equally distributed upon two, as in my knife.

A, represents the blade which may be of any suitable shape and is made of good sheet steel, its upper extremity being bent, as shown in Fig. 2, so as to have the blade to stand out from the handle.

B, is the handle to which the blade is attached directly by screws. This blade is secured in the center of the handle between the two arms C, C, of the handle. These arms are so formed on the handle B, that they stand a considerable distance from the side or face of the blade, as seen, Fig. 2. By attaching this blade to the center of the handle B, it must be evident that greater leverage is obtained and that the power is more equally distributed and that the knife can be used more easily and effectually than what it can when made in the manner shown in Fig. 4, for if the power be exerted upon the knife in the manner illustrated in Fig. 3, it will cut vertically and horizontally, as shown by the red lines *a*, *b*, and have a pressure always in that direction owing to the position of the operator and the action of his arms, and consequently the knife will always cut more effectually and the power will be equally distributed between the lines *a*, *b*, as indicated by the arrow *c*, and owing to this equal distribution of power the knife will not have a tendency to rise from the bottom of the stack of hay, as in the use of the ordinary knife shown in Fig. 4, the action of this knife being very different from that shown in Fig. 3, for when the power is applied to the handle F, the blade G, will be caused to cut in the direction shown by the red lines *d*, *e*, and consequently its action will not be so effectual as if the pressure was applied vertically, which cannot be the case owing to the position of the operator and the consequent action of his arms, and as there is but very slight vertical pressure exerted there will be but slight resistance at the bottom of the stack and the knife will be caused to act in the direction indicated by the red arrow *f*, and force the hay out at the sides of the stack instead of cutting it as effectually as is done by my knife.

What I claim as my invention and desire to secure by Letters Patent, is,

Attaching a blade made of sheet steel and bent at its upper extremity so as to stand out from the handle, directly to, and in the center of the handle B, and between the arms C, C, whereby a great saving in time, labor and expense in making hay knives can be effected, and an equal distribution of the power of the operator exerted in a perfect manner upon the edges of the knife and it consequently caused to act more effectually upon the hay, than the ordinary knife; substantially as herein set forth and described.

SETH WHALEN.

Witnesses:
DAVID MAXWELL,
SEYMOUR CHASE.